United States Patent [19]

Zimmermann

[11] Patent Number: 4,553,676
[45] Date of Patent: Nov. 19, 1985

[54] INSULATED CONTAINER

[75] Inventor: Anso Zimmermann, Bad Hersfeld, Fed. Rep. of Germany

[73] Assignee: Rotpunkt Dr. Anso Zimmermann, Bad Hersfeld, Fed. Rep. of Germany

[21] Appl. No.: 573,471

[22] Filed: Jan. 24, 1984

Related U.S. Application Data

[63] Continuation-in-part of Ser. No. 532,858, Sep. 16, 1983, abandoned.

[30] Foreign Application Priority Data

Jan. 31, 1983 [DE] Fed. Rep. of Germany ... 8302563[U]
Dec. 29, 1983 [DE] Fed. Rep. of Germany ....... 3347481

[51] Int. Cl.⁴ ............................................. A47J 41/00
[52] U.S. Cl. ................................ 215/13 R; 215/12 R
[58] Field of Search ............. 428/35; 215/12 R, 13 R, 215/12 A

[56] References Cited

U.S. PATENT DOCUMENTS

| 1,712,228 | 5/1929 | Payson et al. | 215/12 R |
| 1,760,321 | 5/1930 | Seigheim | 215/12 R |
| 2,818,990 | 1/1958 | Sommerfeld | 215/13 R |
| 2,859,085 | 11/1958 | Morrison | 215/12 R |
| 3,337,073 | 8/1967 | Angelo | 215/13 R |
| 3,476,277 | 11/1969 | Rownd | 215/13 R |

FOREIGN PATENT DOCUMENTS 857503 12/1960 United Kingdom ............. 215/12 R

Primary Examiner—John E. Kittle
Assistant Examiner—James J. Seidleck
Attorney, Agent, or Firm—Lewis H. Eslinger

[57] ABSTRACT

An insulated container is comprised of an outer shell including a base, a predominantly convex portion, and a predominantly non-convex portion, and an insulating insert positioned in the outer shell. The convex portion and the non-convex portion of the outer shell meet at a seam which is disposed substantially at a transition between convex and non-convex outer surface portions of the outer shell. The outer shell has a lower opening with a first diameter in which the base is removably secured. The insulating insert has a maximum diameter which is less than the first diameter so that the insulating insert is insertable into the outer shell through the lower opening prior to securing the base in the lower opening.

7 Claims, 2 Drawing Figures

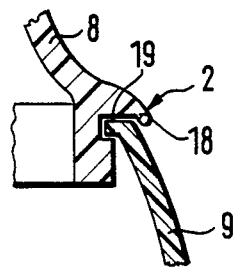
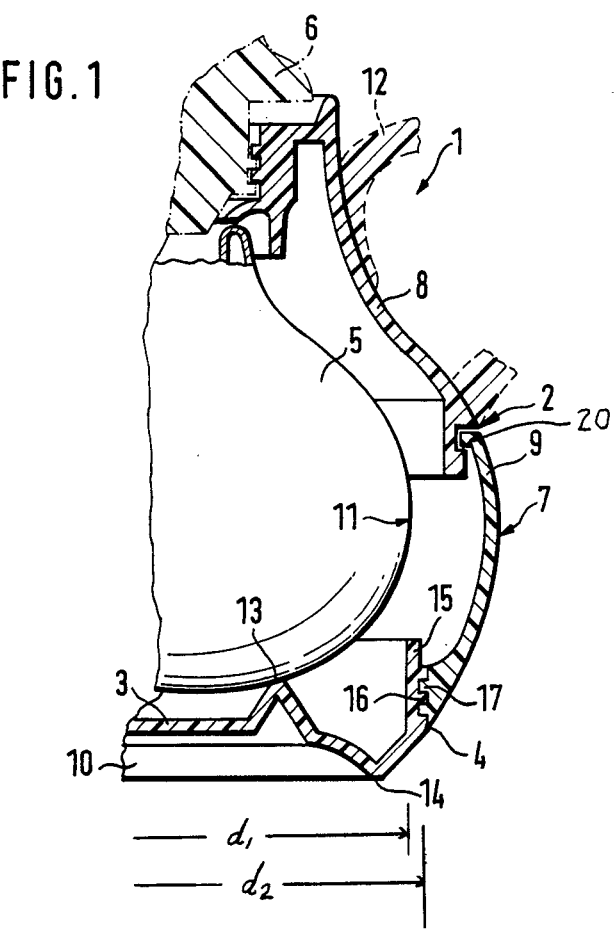

INSULATED CONTAINER

CROSS-REFERENCE TO RELATED APPLICATION

This is a continuation-in-part of U.S. application Ser. No. 06/532,858, filed Sept. 16, 1983 abandoned.

BACKGROUND OF THE INVENTION

This invention relates generally to an insulated container and, more particularly, is directed to an insulated container formed of an outer shell or jacket and an insulated insert supported therein.

It is sometimes desirable to group or align in a row modern insulating containers such as bellied coffee containers with conventional non-insulating containers. The insulating containers can thus be used along with valuable and antique conventional containers, as well as with porcelain containers, without visual disturbance or detection, even though the insulating containers are made of modern plastic.

Two problems are encountered in the manufacture of such an insulating container, however. One problem is the manufacture of the outer surface of the container with a belling-out or convexity. Known shaping processes for making a plastic outer shell can be used, but they are very expensive when the outer surface has a pronounced convexity because the forms for producing the outer shell must be injection molded. A second problem is that the insulating insert, which has the same convexity as the plastic outer shell, must be inserted into the outer shell from below. Usually, a section of the outer shell forming a floor is removed from the belling or convexity of the outer shell for such purpose.

In order to deal with such problems, it has been proposed to cut the outer shell at the point of largest diameter thereby to form a seam. Such a seam provides the simplest method of manufacturing the outer shell with the desired convexity while permitting the introduction of the insulating insert into the shell. The seam, however, is quite visible and is disturbing because it is located in the visually exposed region of the convexity of the outer shell. An objectionable seam has been considered unavoidable, however.

OBJECTS AND SUMMARY OF THE INVENTION

Accordingly, it is an object of this invention to provide an insulated container that avoids the above-described difficulties encountered with the aforementioned arrangement.

More particularly, it is an object of this invention to provide an insulated container which is not readily recognizable as such.

It is another object of this invention to provide an insulated container having an outer shell formed of a base and a jacket in which the jacket has at least a portion thereof formed with a convex or pot-bellied configuration without a seam.

In accordance with an aspect of this invention, an insulated container comprises an outer shell including a base, a predominantly convex portion and a predominantly non-convex portion, the convex portion and the non-convex portion meeting at a seam which is disposed substantially at a transition between convex and non-convex outer surface portions of the outer shell, the outer shell having a lower opening with a first diameter and in which the base is removably secured; and an insulating insert positioned in the outer shell and having a maximum diameter less than the first diameter so that the insulated insert is insertable into the outer shell through the opening prior to securing the base in the lower opening.

The above, and other objects, features and advantages of the present invention will be apparent from the following detailed description of an illustrative embodiment thereof which is to be read in connection with the accompanying drawings.

BRIEF DESCRIPTION OF THE DRAWINGS

FIG. 1 is a partial cross-sectional view of an insulated container according to an embodiment of the present invention in which the jacket is formed of an upper section and a lower single piece convex section formed without a seam; and FIG. 2 is an enlarged, partial view of the seam between two sections of the jacket of FIG. 1.

DETAILED DESCRIPTION OF THE PREFERRED EMBODIMENT

Referring to the drawings in detail, and initially to FIG. 1 thereof, the insulated container 1 according to an embodiment of the present invention includes an outer shell having a jacket formed of an upper section 8 and a lower section 9 and which is made, for example, from a synthetic material. The jacket has a clearly defined convex profile 7 at its lower section 9, that is, has a configuration which increases along the vertical axis of the jacket, starting from the upper end thereof, to a maximum diameter and then decreases. The upper end of the jacket is open and is adapted to be closed by a lid 6 which may be screw-threadedly received within the upper end of the jacket or merely snapped onto or within the upper end of the jacket. The lower end of the jacket forms a bottom opening 4 having a minimum diameter $d_2$, and is formed with screw threads 16. Further, a handle 12 may be attached to upper section 8 by any suitable means.

The outer shell of insulated container 1 also includes a base 3 formed with a support section 10 having a circular ring section 14 for supporting insulated container 1. Base 3 also includes an upstanding or vertical outer circumferential section 15 formed with external screw threads 17 for mating with threads 16 to interlock or secure base 3 to the jacket.

An insulated insert 5, for example, a glass insert of the Dewar type, is inserted within the outer shell of insulated container 1 through opening 4 at the lower end in the jacket. It is to be appreciated that insulated insert 5 has a convex or pot-bellied configuration 11 similar to that of the convex configuration 7 of the jacket. In this regard, the maximum diameter $d_1$ of insulated insert 5 is less than the minimum diameter $d_2$ of opening 4 of the jacket so that insulated insert 5 can be readily inserted within the jacket. Thereafter, base 3 is screwed or interlocked with the jacket to lock insulated insert 5 within the outer shell of insulated container 1. To this end, base 3 is formed with a ring-shaped bearing surface 13 on which insulated insert 5 is supported within the outer shell of insulated container 1. It is to be appreciated that the upper open end of insulated insert 5 fits tightly within the opening at the upper end of the jacket to prevent any movement of insulated insert 5 within the outer shell of insulated container 1 when base 3 is secured to the jacket. It is to be further appreciated that the distance between the outside of insulated insert 5 and the inside of the jacket, particularly in the convex sections thereof, is considerably less than shown in the figure, which distance is enlarged merely for ease of explanation of the present invention.

In accordance with the present invention, the convex section 7 of lower portion 9 is formed as a single piece construction without any seam, for example, by means of an overlapping core mold-removal technique. As a result, container 1 is not readily recognizable as an insulated container. Other advantages also accrue by providing the convex section 7 of the jacket without a seam. For example, if the jacket and support section 10 of the base 3 are made of a synthetic material, it is possible to metallize the outside of the synthetic outer shell of insulated container 1. It is, of course, obvious that the outside of the jacket can be decorated in any suitable manner.

It is to be appreciated that, even though the jacket is formed of two sections in the embodiment of FIG. 1, it is important that the lower section 9 formed with the convex portion 7 is formed as a single piece construction without any seams therein and therefore does not provide any jarring interruptions, that is, it is not possible to determine that the container is an insulated container because there is no seam in the convex portion 7. Thus, with the embodiment of FIG. 1, the upper and lower sections 8 and 9 of the jacket may be decorated differently, that is, with different colors or the like, in order to create a desired visual effect. It is to be noted that upper and lower sections 8 and 9 may include a respective notch and groove, as shown in FIG. 1, for securing the sections together. Such notch and groove of the two sections are preferably positioned just below handle 12 in the transition area between the non-convex portion of container 1 and the convex portion of container 1 so that they are not readily visible by inspection.

It is important that no visually disturbing seam or break appear in the convex portion 7 of the outer shell. A distinctive arrangement of colors, for example, can be chosen for sections 8 and 9 to achieve the proper visual appearance of container 1.

The enlarged partial view of FIG. 2 illustrates how a seam 2 between upper section 8 and lower section 9 is visually concealed. An encircling projection 18 is formed on the outer surface of upper section 8 to extended downward therefrom over a joint 19 of seam 2. Joint 19 is thus not visible from the outside of container 1.

A locking means 20 can be used to clamp or secure upper section 8 and lower section 9 to each other and thereby restrict the movement of sections 8, 9 relative to each other. As shown in the illustrated embodiment, locking means 20 may simply comprise an inwardly directed rim or flange formed on the upper edge of lower section 9 and which snaps into a corresponding outwardly opening annular groove in upper section 8.

When lower section 9 is made of a resilient plastic material, its rim or flange can snap into and be permanently retained in the groove of upper section 8. Locking means 20 could alternatively comprise, for example, mating screw threads formed on upper and lower sections 8, 9, or a bayonet catch.

Having described a specific preferred embodiment of the invention with reference to the accompanying drawings, it is to be understood that the present invention is not limited to that precise embodiment, and that various changes and modifications may be made by one of ordinary skill in the art within the scope and spirit of the invention as defined by the appended claims.

What is claimed is:

1. An insulated container comprising:
    an outer shell including a removable base, a predominantly convex portion and a predominantly non-convex portion, said convex portion being a lower section of said outer shell, and said convex portion and said non-convex portion meeting at a seam which is disposed substantially at a transition between convex and non-convex outer surface portions of said outer shell, said outer shell having a lower opening with a first diameter and in which said base is removably secured; and
    an insulating insert having a convex configuration positioned in said outer shell and having a maximum diameter less than said first diameter so that said insulating insert is insertable into said outer shell through said lower opening prior to securing said base in said lower opening.

2. An insulated container according to one of claim 1; further comprising locking clamp means for clamping said convex and non-convex portions to each other at said seam.

3. An insulated container according to claim 2; wherein said locking clamp means is, in respect to movement of said convex and non-convex portions relative to each other, a non-detachable locking clamp.

4. An insulated container according to claim 1; wherein one of said convex and non-convex portions has an encircling projection adjacent said seam and overlapping the other of said convex and non-convex portions for hiding said seam.

5. An insulated container according to one of claims 1 and 2; wherein said base has screw threads and said outer shell has screw threads at said lower opening thereof for mating with said screw threads of said base to secure the latter to said outer shell.

6. An insulated container according to claim 1; in which at least one of said convex and non-convex portions and said base is of a synthetic material.

7. An insulated container according to claim 1; wherein said insulating insert has a pot-bellied configuration with a diameter that increases to a maximum and then decreases.

* * * * *